Dec. 2, 1969 W. C. ALBERT 3,481,204
TRANSLATION SENSOR
Filed July 18, 1966 2 Sheets-Sheet 1

*INVENTOR.*
WILLIAM C. ALBERT
BY
Constantine A. Michalos
ATTORNEY

Dec. 2, 1969  W. C. ALBERT  3,481,204
TRANSLATION SENSOR
Filed July 18, 1966  2 Sheets-Sheet 2

INVENTOR.
WILLIAM C. ALBERT
BY
Constantine A. Michalos
ATTORNEY

United States Patent Office 3,481,204
Patented Dec. 2, 1969

3,481,204
TRANSLATION SENSOR
William C. Albert, Waldwick, N.J., assignor to Singer-General Precision, Inc., a corporation of Delaware
Filed July 18, 1966, Ser. No. 569,790
Int. Cl. G01p 1/00, 3/00
U.S. Cl. 73—490
11 Claims

ABSTRACT OF THE DISCLOSURE

A housing is provided containing a proof mass and a float immersed in a viscous fluid. The proof mass is adapted to be displaced along a predetermined axis in response to an applied acceleration whereas the float being submerged in the fluid at a neutral buoyancy condition does not react to the applied acceleration. However, a compression spring interposed between the proof mass and the float exerts a force sufficient to move the float through the fluid. The damping of the displacement of the proof mass and the movement of the float by the viscous fluid, respectively, is effective to perform a double integration of the input acceleration; hence, the displacement of the float within the housing is proportional to the displacement of the housing. Suitable means are provided to sense the displacement of the float.

---

This invention relates to an inertial instrument or sensor which measures vehicular translation, and more particularly to an accelerometer which performs a double integration of a vehicle input acceleration and which provides an output proportional to the vehicle displacement.

Heretofore, the methods of performing this function included performing a double integration of an accelerometer output or a single integration of an integrated accelerometer or velocity meter output. The disadvantages of this old method of operation is the necessity of using complexly constructed instruments that necescsitated the use of one or two integrating circuits or mechanisms in addition to an accelerometer or velocity meter.

In the present invention there is provided an accelerometer having an output signal in its simplest form such as a switch closure when the vehicle reaches a preset translation. This switch action can be used to terminate thrust or initiate other functions. The point along the vehicle trajectory at which the switch closes can be adjustable and the use of capacitive or inductive type pickoffs is also possible for analog outputs. If desired, a single instrument could be used having two outputs, one output of which can be proportional to instantaneous vehicle translation and the other output proportional to instantaneous vehicle velocity.

When the accelerometer is used as a switch and is equipped with an automatic temperature compensation feature described hereinafter, it will require no warmup and no excitation other than possibly a start signal. Where a warmup time and power are available, a device which incorporates a heater-sensor can be proposed. In addition, this device also can incorporate means for preventing the proof mass from responding to minor accelerations. A velocity switch utilizing a single damping means with a single flow-restrictive passage is fully described in U.S. Patent No. 3,239,620, issued to the same inventor and assigned to the same assignee as the present invention.

An object of this invention is to provide a double integrating accelerometer of a simplified construction utilizing no excitation other than perhaps latch magnet power.

Another object of this invention is to provide an accelerometer necessitating no warmup time, that is rugged, has a wide range of operational temperatures, and does not respond to minor accelerations.

A further object of this invention is to provide an instrument which performs a double integration of vehicle input acceleration and which has an output proportional to the vehicle translation.

An additional object of this invention is to provide for an instrument which performs a double integration of vehicle acceleration providing an output proportional to the vehicle displacement, and further incorporates simplicity of construction, is compact, and has a laminar type of flow damping with a substantially constant fluid damping coefficient over a wide range of fluid viscosities, flow velocities and temperature gradients.

Further objects and advantages of the present invention will be specifically pointed out or will otherwise become apparent when referring, for a better understanding of the invention, to the following description taken in conjunction with the accompanying drawings, wherein.

Figure 1:
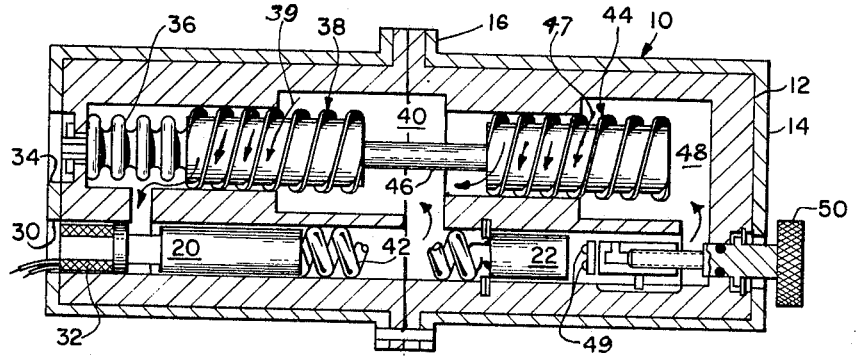
FIGURE 1 is a side sectional view showing the overall switch in accordance with a preferred embodiment of the present invention.
Figure 3:
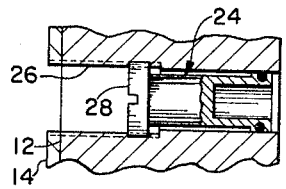
FIGURE 3 is a sectional detailed view taken along line 3—3 of FIGURE 2.
Figure 2:
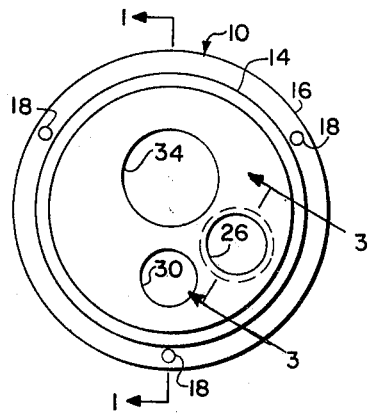
FIGURE 2 is an end view of FIGURE 1.

Referring now to FIGURES 1 to 3 of the drawing, an accelerometer 10 is shown having a fluid filled cylindrical housing 12, encased in a thermal insulation jacket 14 which limits the internal temperature gradients of the accelerometer 10 during external temperature changes.

The housing 12 and jacket 14 include a flange 16 having bolt openings 18 for inserting bolts for mating and attaching the accelerometer 10 to a vehicle frame, not shown.

Internally the accelerometer 10 includes a proof mass 20 which reacts to vehicle input acceleration, and a float 22 which does not react to the vehicle input acceleration. That is, the proof mass 20 moves relative to the vehicle frame during an input acceleration, since it is relatively heavier than the float 22, while the float 22 does not move due to the input acceleration because it is submerged in the fluid within the housing 12 at neutral buoyancy condition.

The damping fluid used is usually silicon oil which provides viscous damping for the translation of the proof mass 20 and for the float 22. This housing 12 is so designed that it contains the damping fluid while constraining the proof mass 20 and the float 22 to just axial translation.

In order that the internal volume of the housing 12 can be filled with a calibrated volume of fluid and thus prevent any voids, there is provided, as shown in FIGURE 3, an internal volume adjuster 24 insertable through an opening 26 of the housing 12 and jacket 14. The volume adjuster 24 includes the opening 26 through which is inserted a screw 28 that may be screwed inwardly within the housing 12 to reduce the internal volume of the housing 12 or it may be screwed outwardly to increase the volume of the housing 12 so that the housing 12 can receive more damping fluid.

In addition to the opening 26 in which is threaded the screw 28, there is provided an opening 30 to receive a control means or latch magnet 32, as shown in FIGURE 1, which holds the proof mass 20 in its forward position and releases it when a substantial input acceleration is presented to the accelerometer 10. The magnet 32 may be of a permanent type or may be an electromagnetic arrangement depending on the device application.

Further, there is provided an opening 34 through which may be inserted bellows 36 which compresses, due to fluid expansion, and positions an associated constant damping coefficient means or variable length helical groove flow passage device 38. It should be noted that the helical groove device 38 serves as a flow passage, as shown by arrows 39, of the fluid contained within a hollow portion 40 of the housing 12.

Interposed between, and connecting the proof mass 20 and the float 22, is a compression spring 42 which exerts a force to move the float 22 proportional to the translation of the proof mass 20.

Figure 5:
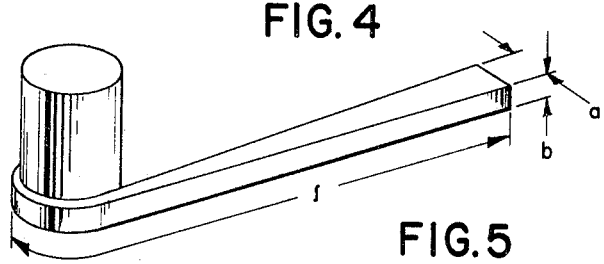
FIGURE 5 is a perspective view showing the groove characteristics of an element of FIGURE 1.

As shown in FIGURE 1, there is provided an additional constant damping coefficient means or variable length helical groove flow passage device 44 which is associated with the fluid displaced by the float 22. The helix or groove device 38 associated with the proof mass 20 is connected to the helix or groove device 44 associated with the float 22, by a connecting rod 46. The rod 46 joins the two devices 38 and 44 so that they will be moved in unison by the bellows 36 when the bellows compresses or expands, due to fluid expansion or compression respectively, for positioning the devices 38 and 44 dependent on the environmental temperature. It should be noted here again that the helical groove device 44 serves as a flow passage, as shown by arrow 47, of the fluid contained within another hollow portion 48 of the housing 12. Therefore, the helical device 38 regulates the flow or dampens the movement of the proof mass 20 and the helical device 44 regulates the flow or dampens the movement of the float 22. When the proof mass 20 reacts to an input acceleration, it will impel the damping fluid to flow from the hollow portion 40 of the housing 12, and through the helical device 38, as shown by arrows 39. The float 22 will then react to the movement of the proof mass 20 through the spring 42 to impel the damping fluid to flow from the hollow portion 48 and through the helical device 44, as shown by arrows 47. It should be noted that if the helical device 38, which has substantially the same configuration as helical device 44, is laid out straight, it would have the characteristics shown in FIGURE 5, where $l$ is the laid out length, $a$, is the depth and $b$ is the width of the groove 38. The devices 38 and 44, as shown in FIGURE 5, have the width $b$, preferably a constant dimension and the depth $a$ preferably a varying dimension for providing a constant damping coefficient as disclosed in the hereinbefore-mentioned U.S. Patent No. 3,239,620.

In addition, the accelerometer 10 is provided with electrical contacts 49 which close when engaged by the float 22 to give an indication that the accelerometer attained a preset vehicle translation. The contacts 49 are adjusted axially to the housing 12 by a contact adjuster 50 which varies the axial position of the contacts 49 to a range of vehicle translation settings.

Referring to the schematic representation of the device shown in FIGURES 4 to 8, to describe the basic principles of the operation of this system, it should be noted that the translation sensor or accelerometer 10 is basically an inertial instrument which performs a double integration of vehicle input acceleration and has an output proportional to vehicle translation. The integrations are actually performed by the viscous damping of the fluid. In order that the device be accurate, the damping coefficients of the proof mass 20 and the float 22 must be maintained constant during operation.

Figure 4:
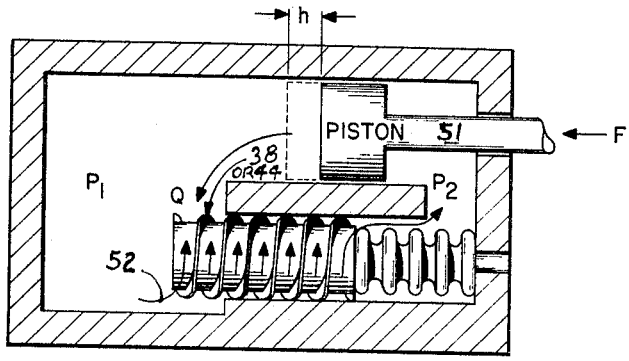
FIGURE 4 is a schematic view showing the automatic temperature compensation of the system.

As brought out before, since the integrations are actually performed by the viscous damping, in order that the device be accurate, the damping coefficient $D_m$ of the proof mass 20 and the damping coefficient $D_n$ of the float 22 must be maintained constant during operation. Therefore, these damping coefficients $D_m$ and $D_n$ are dependent on the physical characteristics of the fluid flow paths and the fluid viscosity. Since fluid viscosity varies with temperature, either the temperature must be closely controlled by a heater-sensor arrangement or if no temperature control is used, the physical characteristics of the flow path must change with temperature to compensate exactly for the change in fluid viscosity.

Where warmup time is allowable and heater power is available, the device would include an electronics package along with a heater-sensor for temperature control. This system is applicable where no warmup time and no power is available. In this invention an automatic temperature compensation mechanism is employed. This version of the device is schematically shown in FIGURE 4. It is completely passive, requires no excitation, and always is ready for instant operation within a wide range of operating environment.

Figure 6:
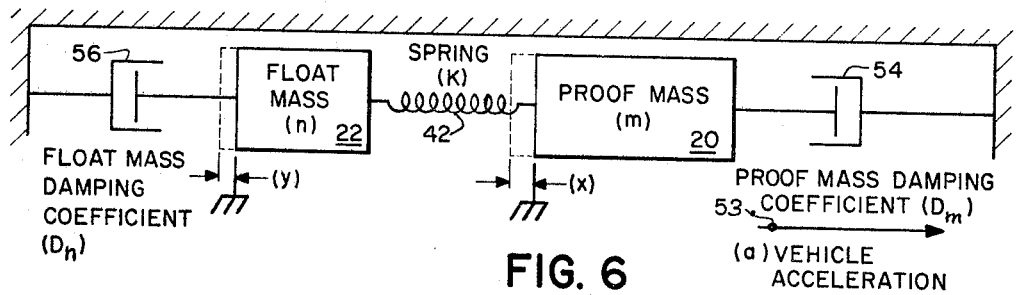
FIGURE 6 is a block diagram showing a free-body schematic representation of the system to describe the basic principles of its operation.

FIGURE 4 schematically shows a piston 51 as either the proof mass 20 or the float 22 which is displaced a distance $h$ as a result of a force F, analogous to an input acceleration acting on the proof mass or the spring 42 force acting on the float displacing them at distances of $x$ and $y$, shown in FIGURE 6. In other words, the displaced distances $x$ and $y$ are more specifically due to the $ma$ and $Kx$ forces respectively. Where, $m$ is mass; $a$ is acceleration; K is spring constant; and $x$ is displacement. The force F will cause a pressure differential ($\Delta p$) for a piston of area A. Therefore:

$$\Delta p = p_1 - p_2 = F/A$$

The fluid will be displaced at a rate Q where:

$$Q = A \frac{dh}{dt}$$

Where, $h$ is displacement and $t$ is time. This displaced fluid must flow through the helical groove flow path, as shown by arrows 52, in FIGURE 4. From fluid mechanics, the equation which described laminar flow through such a flow path is:

$$Q = \frac{a^3 b \Delta p}{12 \mu l}$$

when $a$ is much smaller than $b$ where:
  $\mu$ is absolute fluid viscosity,
  $a$, $b$ and $l$ are depth, width, and length of the groove, respectively, as shown in FIGURE 5, and
  $\Delta p$ is the pressure differential.

Summing the forces on the piston reveals the following steady state conditions:

$$F = D \frac{dh}{dt}$$

where: D is the damping coefficient.

The hereinbefore outlined equations are combined and the constant terms A and 12 are combined in one term K to give the following:

$$D = \frac{K\mu l}{a^3 b}$$

Fluid expansion with increasing temperature is compensated for by compression of the bellows. As shown in FIGURE 4, since the helix is attached to the bellows, more turns of the helical flow path enter the bore of the housing increasing the length $l$ of the flow path. The net effect is that for an increasing temperature, the decreasing fluid viscosity $\mu$ is compensated for by an increasing flow path length $l$ as outlined in the last equation. The reverse is true for decreasing temperature. Since the fluid expands linearly with temperature, the bellows will contract and the flow path length $l$ will also vary linearly with temperature. However, fluid viscosity does not vary linearly with temperature and to compensate for this non-linear behavior the depth $a$ of the groove in FIGURE 5 varies in a non-linear manner along the axial length of the helix. The overall behavior of the temperature compensation mechanism is to maintain the term $\mu l/a^3 b$ in the last equation, constant over the operational temperature.

Referring to the block diagram of FIGURE 6, it can be seen that when there is an input acceleration in the direction shown by arrow 53 and the proof mass 20 is released by the latch magnet 32, the proof mass 20 will react to the input acceleration $a$ and will move a distance $x$ while the spring K will be moved by the proof mass 20 to induce a movement in the float 22 a distance $y$. The damping feature of the accelerometer is shown schematically by a piston and cylinder arrangement 54 representing the proof mass damping coefficient $D_m$ associated with the motion of the proof mass 20, and by a piston and cylinder arrangement 56 representing the float damping coefficient $D_n$ associated with the motion of the float 22.

In the operation of this system wherein the float 22 moves towards the right, as viewed in FIGURE 1, the float 22 will contact the electrical contacts 49 which will close an electrical circuit, not shown, indicating that the accelerometer has obtained a preset vehicle translation.

It should be noted that in the equations, herein outlined, are disclosed the following assumptions necessary to the actual approach of the design concept:

(1) That steady state conditions exist;
(2) The force exerted by the spring 42 on the proof mass 20 is negligible compared to the inertial force $ma$;
(3) In determining the spring deflection $x$ minus $y$, $y$ is extremely small compared to $x$ and is therefore neglected;
(4) The fluid is Newtonian;
(5) The float is neutrally buoyant and does not react, relative to the vehicle frame, to vehicle acceleration; and,
(6) That the mass of the spring is negligible.

Figure 7:
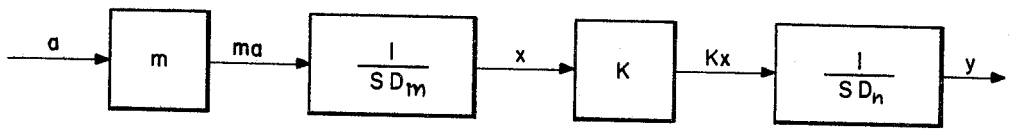
FIGURE 7 is another block diagram showing a schematic representation of the operational features of the invention; and, FIGURE 8 is a single block diagram showing a possible reduction of the operational features of the invention.
Figure 8:
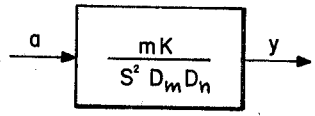

Therefore, the above system will behave as shown in the block diagram of FIGURE 7 which represents the system in operation notation, and where:

$a$ is vehicle acceleration
$s$ is vehicle translation
$m$ is a proof mass of mass $m$ which reacts to the input acceleration $a$
$n$ is a float which, because it is submerged in a fluid at neutral buoyancy condition, does not react, relative to the vehicle frame, to the input acceleration
K is a spring of spring rate K
$D_m$ and $D_n$ are the damping coefficients associated with motion of the proof mass $m$ and float $n$ respectively
$x$ and $y$ are displacements, relative to the frame, of the proof mass and float respectively The schematic or block diagram of FIGURE 7 can be reduced to a single block notation, as shown in FIGURE 8.

Therefore, in equation form $$y = \frac{m^K}{D_m D_n} \cdot \frac{a}{S^2}$$

where: S is an operator denoting $d/dt$.

The term $a/S^2$ in the time domain is the double integral of instantaneous vehicle acceleration or vehicle translation $s$. Therefore, $y$ in the time domain is proportional to instantaneous vehicle translation $s$.

$$y = \frac{m^K}{D_m D_n} \cdot s$$

$y$ in the device is actually the axial distance between the float 22 and the contacts 49 and is adjustable. When the float 22 engages the contacts 49, the contacts 49 will close and give an output indication to signal the vehicle has attained a preset translation.

The integrations are actually performed by the viscous damping, and therefore, for the device to be accurate, the damping coefficients $D_m$ and $D_n$ must be maintained constant during operation. These damping coefficients are dependent on the physical characteristics of the fluid flow paths and the fluid viscosity. Since fluid viscosity varies with temperature, that is, about one percent per degree Fahrenheit for silicon oil, the physical characteristics of the flow path must change with temperature to compensate exactly for the change in fluid viscosity.

The advantage of this invention, therefore, is to provide a simple accelerometer performing a double integration of a vehicle input acceleration and providing an output proportional to vehicle acceleration. This instrument, besides its simplicity of construction, requires no excitation other than perhaps the latch magnet power, it needs no warmup time, it is rugged and has a substantial operational temperature range.

There is alternate methods of construction which may include a capacitive or inductive type of pickoff devices for an analog output instead of a switching output. The proof mass translation is proportional to the instantaneous vehicle velocity and if a pickoff were installed to detect its motion, the device could have an indication of vehicle velocity as well as vehicle displacement.

While the present invention has been described in a preferred embodiment, it will be obvious to those skilled in the art that various modifications can be made therein within the scope of the invention, and it is intended that the appended claims cover all such modifications.

What is claimed is:

1. A vehicle translation sensor comprising, a housing containing a viscous damping fluid, a proof mass within said housing operably responsive to an input acceleration for movement within said housing, which movement is damped by the viscous fluid, a float submerged in the viscous fluid at neutral buoyancy condition whereby said float is nonresponsive to the input acceleration, a resilient means interposed between said proof mass and said float wherein: the input acceleration imparts translation to said proof mass, said proof mass imparts a force to said resilient means proportional to its translation, and said resilient means transfers said force to said float sufficient to impart a translation to said float proportional to the force transferred thereto by said resilient means; said damping of the movement of said proof mass and the damping of said translation of said float by said viscous fluid being effective to perform a double integration of said input acceleration whereby the translation of said float is proportional to the displacement of said housing, and means for detecting the translation of the float.

2. The structure of claim 1, further comprising a control means operably directing a predetermined holding force on said proof mass at its initial position for restraining said proof mass from responding to minor accelerations while releasing said proof mass for movement when a substantial input acceleration is presented to overcome the predetermined holding force of said control means.

3. The structure of claim 1, wherein said housing includes an enclosure and further comprises an adjustable length flow passage device including means defining a groove, a portion of which extends wtihin the enclosure of said housing, and movable relative thereto substantially in line with the direction of the acceleration for receiving the damping fluid impelled by said proof mass and said float for producing regulated damping associated with the translations of said proof mass and said float during temperature changes.

4. The structure of claim 1, wherein said housing includes an enclosure and further comprising a pair of flow passage devices including means defining helical grooves extending within the enclosure of said housing and movable relative thereto, one flow passage device fluidically associated with said proof mass and the other flow passage device fluidically associated with said float, and temperature control means for automatically adjusting said flow passage devices within the enclosure of said housing due to temperature changes and thereby controlling the groove length of said flow passage devices through which the damping fluid is caused to flow, thereby maintaining constant damping coefficient for said proof mass and said float at various temperature gradients.

5. The structure of claim 1, wherein said housing includes an enclosure and further comprising a pair of flow passage devices including means defining helical grooves extending within the enclosures of said housing and movable relative thereto, one flow passage device receiving damping fluid upon the translation of said proof mass and the other flow passage device receiving damping fluid upon the translation of said float, and temperature control means connecting said flow passage devices for moving them, due to changes of temperature, relative to the enclosure of said housing for changes the effective lengths of the grooves of said flow passage devices thereby changing the distance the damping fluid would flow through said grooves for compensating for the change of temperature, and wherein said helical grooves have a variable cross-sectional area along their length operably compensating the nonlinear variation of fluid vicosity of said damping fluid in relation to changes in the environmental temperature.

6. The structure of claim 5, wherein said temperature control means is a bellows connecting said pair of flow passage devices and operably extending when the temperature decreases and retracting when the temperature increases for relatively decreasing and increasing the length of the groove that the damping fluid is to flow and thereby maintaining constant damping coefficient for said proof mass and said float.

7. The structure of claim 1, further comprising flow passage device fluidically associated with said proof mass and said float and including means defining a helical groove, a portion of which is adjacent to an inner surface of said housing for providing a variable-volume helical flow path for receiving therein damping fluid, a temperature controlled adjusting means operably extending and retracting said flow passage device dependent on increasing and decreasing temperature for respectively decreasing and increasing the number of turns of the helical grooves forming the flow path and respectively decreasing and increasing the length of the helical flow path and thus respectively decreasing and increasing the volume through which the damping fluid must travel and thereby maintaining constant damping coefficient of said proof mass and said float during temperature changes.

8. The structure of claim 1, wherein said housing includes an enclosure and further comprising constant damping coefficient means having a flow-restrictive passage means for damping the fluid displaced by the translation of said proof mass and said float, said constant damping coefficient means including a member longitudinally disposed in the enclosure within said housing and longitudinally movable therein, said flow-restrictive passage means defining a helical groove adjacent the inner surfaces of the enclosure of said housing for defining a variable effective length and thus a variable-volume, dependent to the relative longitudinal position of said flow restrictive passage means within said enclosure and a temperature adjusting means including a bellows, one end connecting said housing and the other end connecting said damping means for relative longitudinal displacement of said flow-restrictive passage means dependent on temperature changes and operable for varying the length of said grooves by longitudinal movement of said flow-restrictive passage means and thereby changing the effective length of the helical groove that is enclosed within the enclosure of said housing thereby changing the size of the flow path directly with temperature for maintaining the damping constant with change of temperature.

9. The structure of claim 1, wherein said housing defines a pair of hollow portions, one hollow portion fluidically associated with said proof mass and the other hollow portion fluidically associated with said float, means for varying the volume of said hollow portions upon the translation of said proof mass and said float, and a helical groove flow passage device supported for movement within said housing for varying the length of the helical groove by longitudinal movement within the hollow portions of said housing, and a temperature controlled means moving said helical groove flow passage device to vary the length of said groove depending on the environmental temperature and thereby produce a constant ratio of damping force to groove length flow over a wide range of fluid viscosity, flow velocity and temperature gradients.

10. The structure of claim 9, further comprising contact means engageable by the float to give an indication that the input acceleration attained a preset translation, and wherein said helical groove flow device defines the groove with a larger cross-sectional area at one end of the flow path than the other for maintaining a constant damping coefficient, and means for adjusting the length of the helical groove linearly with the fluid temperature and thereby maintaining the damping force reacting to the translations of said proof mass and said float constant with changes in the temperature.

11. A doubly-integrating accelerometer comprising:
a fluid-filled housing containing a plurality of compartments, one of said compartments being in restricted flow communication with two additonal compartments:
a proof mass and a float each disposed in said housing for translational displacement therein with concomitant displacement of fluid by the proof mass from said one compartment to one of the two additional compartments and by said float from the other of said additional compartments to said one compartment, displacement of said proof mass being responsive to applied acceleration along a given axis, the float having neutral buoyancy in the fluid whereby it is insensitive to said applied accelerations;
resilient means interposed between and coupling said proof mass and float to transmit to said float a displacing force proportional to the displacement of said proof mass whereby the displacement of said float is related to the applied acceleration by the following transfer function:

$$y = \frac{mKa}{D_m D_n S^2}$$

wherein
 y is the displacement of the float
 m is the mass of proof mass
 k is the spring constant of resilient means
 $D_m$, $D_n$ are the damping coefficients associated with motion of the proof mass and float, respectively,
 and
 $a/S^2$ is equivalent in the time domain to the instantaneous double integral of the applied acceleration, and,
said fluid-filled housing including means to sense the displacement of said float.

References Cited

UNITED STATES PATENTS

| 3,217,121 | 11/1965 | Hradek et al. | 200—61.53 |
| 3,233,464 | 2/1966 | Mol | 73—490 |
| 3,239,620 | 3/1966 | Albert | 200—61.45 |

JAMES J. GILL, Primary Examiner

U.S. Cl. X.R.

73—497; 200—61.53